United States Patent [19]
Underhill et al.

[11] Patent Number: 5,230,193
[45] Date of Patent: Jul. 27, 1993

[54] NET SPREADING APPARATUS FOR ROUND BALER

[75] Inventors: Kenneth R. Underhill, Strasburg, Pa.; Michael L. Bandi, Okeechobee, Fla.

[73] Assignee: Ford New Holland, Inc., New Holland, Pa.

[21] Appl. No.: 894,375

[22] Filed: Jun. 4, 1992

[51] Int. Cl.5 ............................................. B65B 11/04
[52] U.S. Cl. ...................................... 53/556; 53/587; 53/389.3
[58] Field of Search ................. 53/399, 441, 118, 556, 53/587, 588, 141, 389.4

[56] References Cited
U.S. PATENT DOCUMENTS

| 4,691,503 | 9/1987 | Frerich . |
| 4,729,213 | 3/1988 | Raes ............................. 53/118 X |
| 4,790,125 | 12/1988 | Merritt .......................... 53/118 X |
| 4,956,968 | 9/1990 | Underhill . |
| 5,005,747 | 4/1991 | Anstey . |
| 5,090,182 | 2/1992 | Bethge ............................ 53/556 |
| 5,129,208 | 7/1992 | Van Zee ......................... 53/587 X |

FOREIGN PATENT DOCUMENTS

| 81328 | 6/1983 | European Pat. Off. ............... 53/588 |
| 0225398 | 6/1987 | European Pat. Off. . |

Primary Examiner—John Sipos
Attorney, Agent, or Firm—Frank A. Seemar; Larry W. Miller

[57] ABSTRACT

An agricultural baler for making cylindrical bales of crop material having a sledge assembly moveable between bale starting and full bale positions. The sledge assembly includes a plurality of rollers which cooperate with an apron to define a bale forming chamber. A dispensing mechanism is carried on the sledge assembly for dispensing sheet material, such as net or the like, into the bale forming chamber whereupon it is wrapped circumferentially around a cylindrical bale of crop material in the bale forming chamber. A net spreading system is associated with the dispensing mechanism to assure that the net being fed into the bale chamber via the dispensing mechanism is maintained at its nominal width which corresponds generally to the width of the chamber.

8 Claims, 5 Drawing Sheets

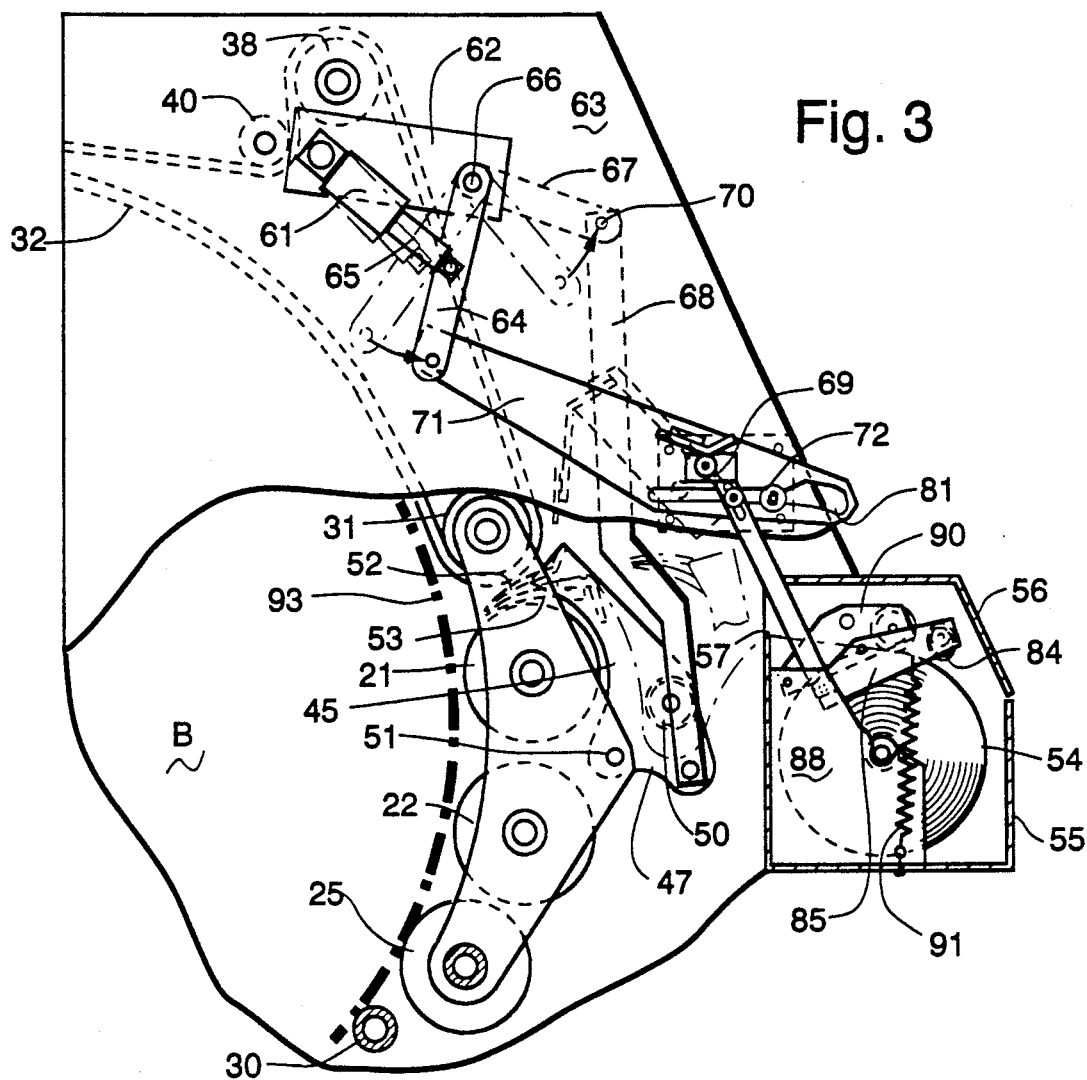
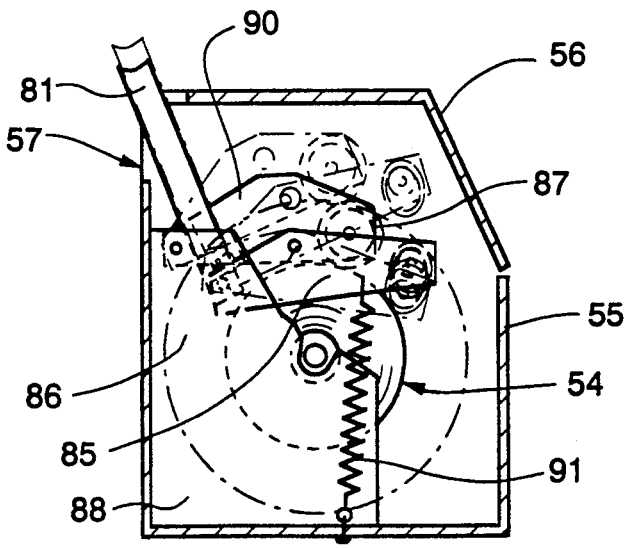

NET SPREADING APPARATUS FOR ROUND BALER

BACKGROUND OF THE INVENTION

This invention relates generally to a baler for forming cylindrical bales of crop material, commonly referred to as a round baler. More particularly, this invention pertains to round bale net wrapping apparatus having an improved net dispensing mechanism.

Prior art balers of this type generally have a bale forming chamber defined by an apron comprising an array of side-by-side belts, transverse slats trained on chains, a plurality of rolls or a combination of these various elements, e.g., rolls and belts. Crop material, such as hay, is picked up from the ground as the baler traverses the field, fed into a flexed or adjustable chamber where it is rolled up to form a compact cylindrical bale. The formed bale is wrapped in its compacted form while still inside the bale forming chamber by net, twine or the like, prior to ejecting the bale from the chamber onto the ground for subsequent handling.

Exemplary of prior art round balers of the general type mentioned above is the baler disclosed in U.S. Pat. No. 4,956,968 issued in the name of K .R. Underhill on Sep. 18, 1990. This baler includes a mechanism for dispensing a net wrapping material into a bale forming chamber to circumferentially wrap a formed cylindrical bale. A unique net clamping arrangement is provided for inserting the net tail into the chamber when wrapping operation commences. In net wrapping systems of this type it is crucial to good bale formation for the net to be wrapped snugly around the crop material and also to be evenly spread across the full width of the bale or substantially the full width.

Problems have been encountered in attempts to accomplish the above advantages because the net being issued from the supply roll and guided through the dispensing mechanism has gone askew in the past for various reasons. The net pulling force is provided by virtue of its leading edge being fed into the nip between the bale and the apron whereby it is drawn around the bale as it is held between the moving bale and apron. When a net encounters pulling force of this nature it tends to reduce the nominal width of the flexible net whereupon a "bunch up" of the net material occurs as it is being fed into the mechanism for dispensing net around the formed bale. In this particular dispensing mechanism, comprising opposing flat clamping members through which the net is guided, it is important for the net to be maintained at its nominal width immediately up stream along its path of travel which in turn results in smooth feeding of the net downstream of the flat clamping members and thereby provide smooth effective feeding.

SUMMARY OF THE INVENTION

An important object of the present invention is to provide the reliability by consistently producing compact and neat hay packages and thereby improves the overall performance.

In pursuance of this and other important objects the present invention provides for new and unique round baler apparatus having a main frame, a tailgate pivotally connected to the main frame and a sledge assembly mounted on the main frame for movement between a bale starting position and a full bale position, the sledge assembly including a plurality of rollers extending transversely of the main frame. The baler further comprises an apron movably supported along a continuous path on the main frame and on the tailgate with an inner course that cooperates with the rollers of the sledge assembly to define a bale forming chamber, dispensing means carried on the sledge assembly for dispensing sheet material into the bale forming chamber in a manner whereby the sheet material is wrapped circumferentially around a cylindrical bale of crop material in the bale forming chamber, and sheet material spreading means mounted on the dispensing means.

According to the broadest aspects of the invention, apparatus of the type above is provided wherein the structure for spreading includes means for operatively engaging the sheet material prior to being dispensed into the bale forming chamber to maintain the sheet material at a width substantially corresponding to the width of the cylindrical bale around which it is being wrapped.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 3 is a detailed side elevation of the net wrapping apparatus of the baler shown in FIGS. 1 and 2.

FIG. 4 is a side elevational view of the net roll supply system used in the net wrapping apparatus shown in FIG. 3.

DESCRIPTION OF THE PREFERRED EMBODIMENT

Figure 1:
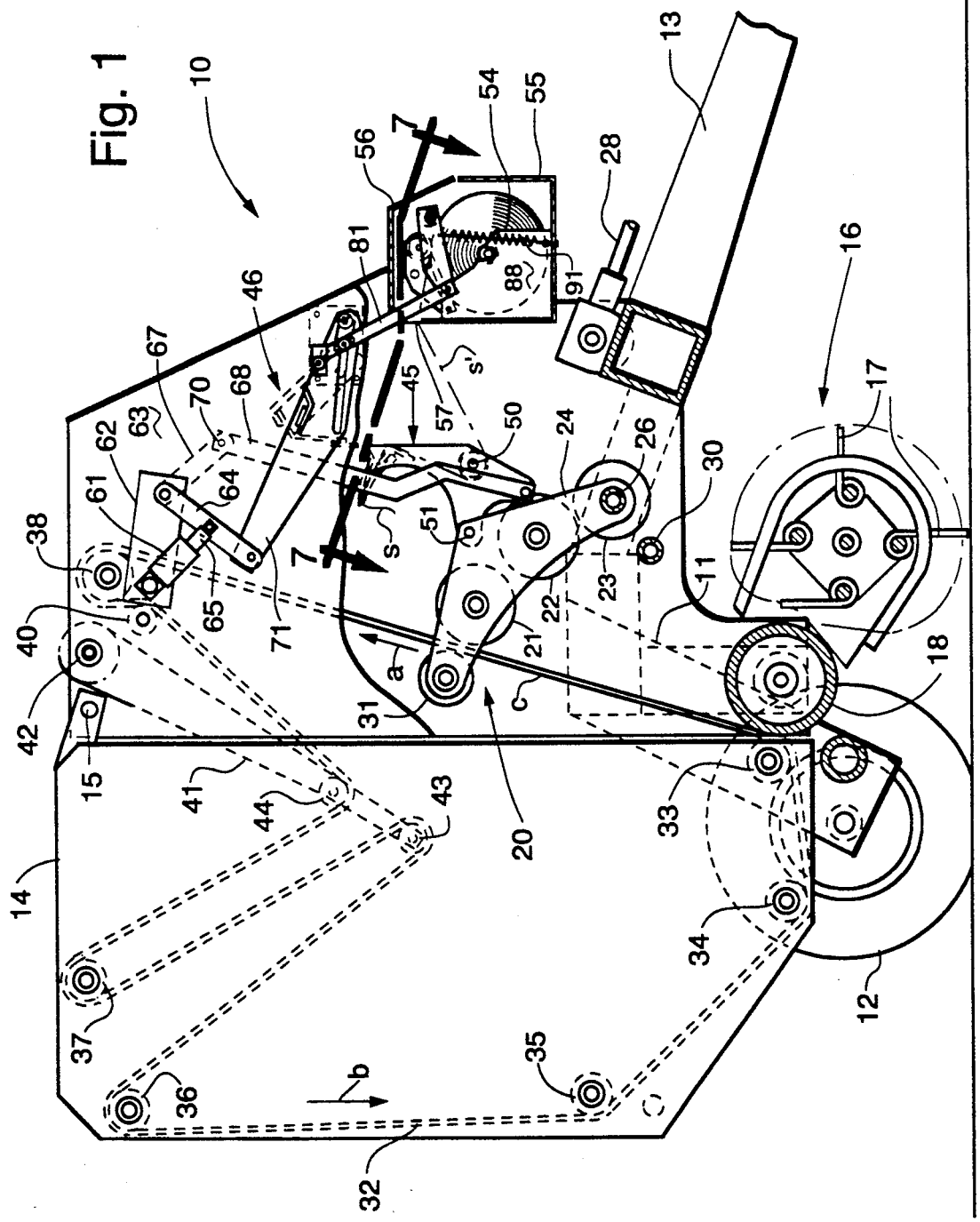
FIG. 1 is a diagrammatic side elevational view of a round baler in which the present invention is embodied and shows the elements in the bale starting position.

Referring now to the drawings for a more detailed description of the preferred embodiment of the invention, FIG. 1 shows an expandable chamber round baler 10 of the type disclosed in U.S. Pat. No. 4,956,968 issued on Sep. 18, 1990 in the name of K. R. Underhill. As will become apparent from the detailed description below, the present invention is directed to an improvement to the net dispensing system employed in balers of this nature and particularly, balers with net wrapping apparatus of the general type disclosed in U.S. Pat. No. 4,956,968.

Figure 2:
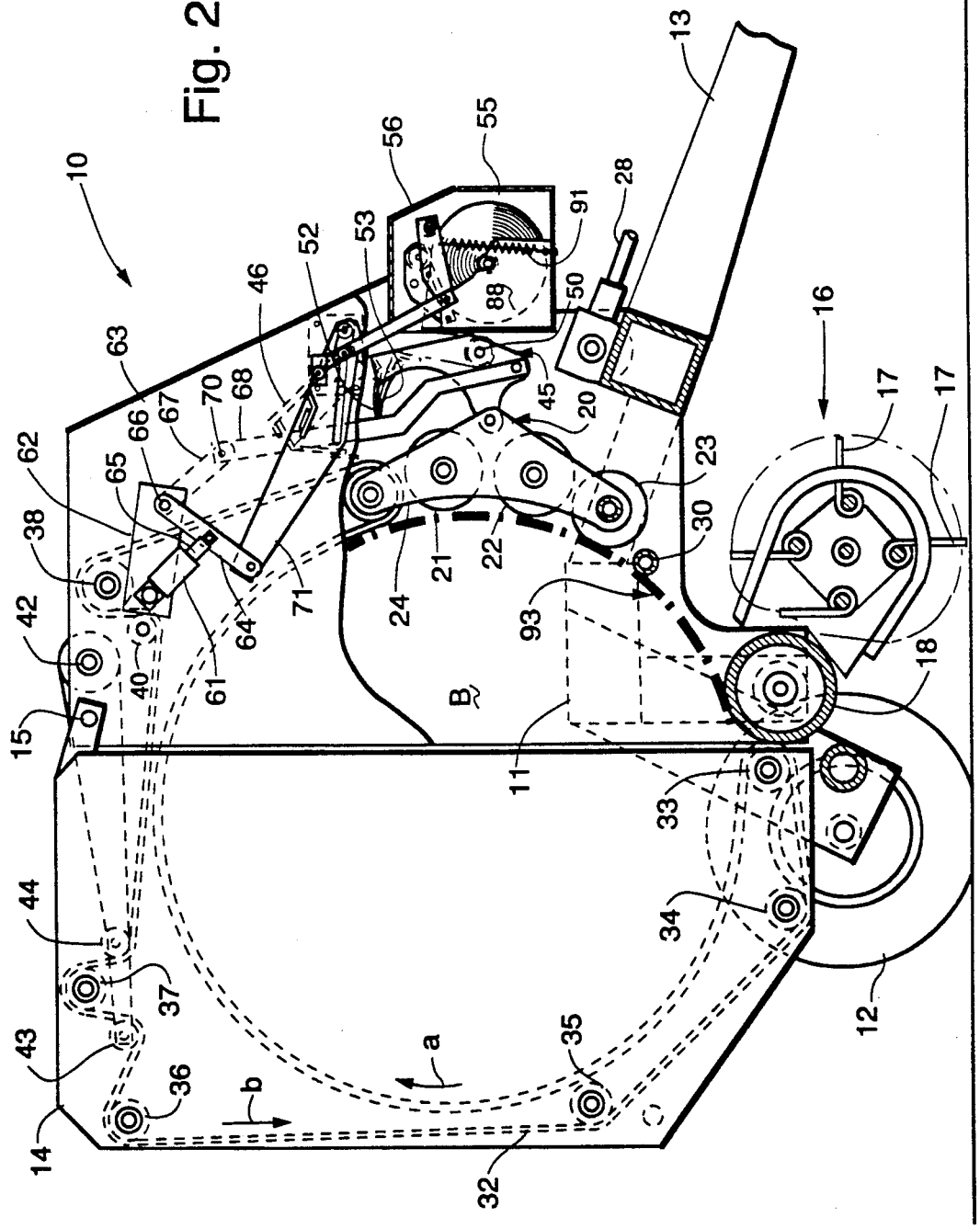
FIG. 2 is a diagrammatic side elevational view similar to FIG. 1 and show, the elements in the full bale position.

Round baler 10 incorporates the preferred embodiment of such net wrapping apparatus and includes a main frame 11 supported by a pair of wheels 12 (only one shown) mounted generally in a well known side-by-side fashion. A tongue 13 is provided on the forward portion of main frame 11 for connection to a tractor (not shown). A tailgate 14 is pivotally connected to the sides of main frame 11 by a pair of stub shafts 15 so that tailgate 14 may be closed as shown in FIG. 1 during bale formation or pivoted open about stub shafts 15 to discharge a completed bale. FIG. 2 also shows the tailgate in the closed position. A conventional pickup 16 is mounted on main frame 11 and is commonly supported by a pair of suitable wheels (not shown). Pickup 16 includes a plurality of fingers or tines 17 movable in a predetermined path to lift crop material from the ground and deliver it rearwardly toward a floor roll 18 which is rotatably mounted on main frame 11.

The bale forming chamber is formed partly by a sledge assembly 20 which includes a plurality of rollers 21, 22, 23 extending transversely of the main frame 11 in the arcuate arrangement seen in FIG. 1-3. Rollers 21, 22, 23 are journalled at their respective ends in a pair of spaced apart roll carrying arms 24, 25 see FIG. 7. These arms 24, 25 are pivotally mounted inside main frame 11 on stub shafts 26, 27 for providing movement of sledge assembly 20 between a bale starting position shown in FIG. 1 and a full bale position shown in FIG. 2. Rollers 21, 22, 23 are driven in counter-clockwise direction as viewed in FIGS. 1-3 by conventional means (for example, chains and sprockets or gears) connected with a drive shaft 28 which is adapted for connection to the power take off of a tractor (not shown). A starter roll 30 is located adjacent roller 23 and is also driven in counter-clockwise direction, as viewed in FIG. 2. An idler 31 is carried by arms 24, 25 for movement In an arcuate path with sledge assembly 20 as it moves between its bale starting position (FIG. 1) and full bale position (FIG. 2). Idler roller 31, freely rotatable, is clearly depicted in FIG. 7.

A conventional apron 32 includes a plurality of continuous side-by-side belts supported by guide rolls 33, 34, 35, 36, 37 which are rotatably mounted in tailgate 14. Apron 32 is also supported on a drive roll 38 which is rotatably mounted on main frame 11. Although apron 32 passes between roller 23 on sledge assembly 20 and idler roller 31, it is only in engagement with idler roller 31 and not roller 21 which is located in close proximity to the apron belts for the purpose of striping crop material from the belts. Further conventional means (not shown) are connected with drive shaft 28 to provide rotation of drive roll 38 by means of coupling with the drive shaft 28 to provide rotation of drive roll 38 in a direction causing movement of apron 32 along its path in a direction indicated by arrows a and b in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown In FIGS. 1 and 2, respectively. Take up arms 41 carrying additional guide rolls 43, 44 for supporting apron 32. Resilient means such as coil springs (not shown) are provided to normally urge take up arms 4 toward their inner positions (FIG. 1) while resisting movement thereof from varying inner positions to their fixed outer positions (FIG. 2), corresponding to bale forming and full bale conditions.

When the elements of round baler 10 are disposed in the condition shown in FIG. 1 with tailage 14 closed, an inner course C of apron 32 extends between lower front guide roll 33 and idler roll 31 to cooperate with rollers 21, 22, 23 on sledge assembly 20 to define the initial bale forming chamber, or as sometimes referred to, the core starting chamber. The apron inner course, referred to above, forms the rear wall of the chamber while the inwardly facing moving peripheral surfaces of rollers 21, 22, 23 define a cooperating front wall. Floor roll 18 is disposed in the bottom of the chamber between the front and rear walls thereof, and starter roller 30 is spaced from floor roll 18 to form a throat or inlet for the chamber, through which crop material is fed.

As round baler 10 is towed across a field by a tractor, pickup tines 17 lift crop material from the ground and deliver it through the throat formed between floor roll 18 and roller 30 and thence into the bale forming chamber of baler 10. The crop material is carried rearwardly by floor roll 18 and thence into engagement with the apron inner course C (FIG. 1) which urges it upwardly and forwardly into engagement with rollers 21, 22, 23. In this manner the crop material is coiled in a generally clockwise direction as viewed in FIG. 1 to start a bale core. Continued feeding of crop material into the bale forming chamber by pickup tines 17 causes the apron inner course C to expand in length around a portion of the circumference if the bale core as the diameter thereof increases. Take up arms 41 rotate from their inner position shown in FIG. 1 toward their outer position shown in FIG. 2 to provide for expansion of the inner course of the apron in a well known manner, i.e., in effect the outer course of the belts of apron 32 are diminished in length while the inner courses increase in a like amount. When a bale has been formed and then wrapped with sheet material such as net (described below), tailgate 14 is opened by conventional means (for example, hydraulic cylinders) and the bale is ejected rearwardly. Subsequent closing of tailgate 14 returns the apron inner and outer courses of the belts of apron 32 to the locations shown in FIG. 1, and round baler 10 is ready to form another bale.

It will be understood that during formation of a bale, sledge assembly 20 also moves between a bale starting position (FIG. 1) to a full bale position (FIGS. 2 and 3). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 31 and apron 32 during formation of a bale. Sledge assembly 20 is pushed outwardly towards its full bale position during bale formation as the crop material expands against the rollers and is pulled inwardly to the home position shown in FIG. 1 during bale ejection without utilizing any additional mechanisms.

In an alternative embodiment of the round baler 10 which is not shown, apron 32 could comprise a pair of chains connected together at spaced intervals by transverse slats, and the idler roller 31 would be replaced by a pair of idler sprockets engaged with the chains. Aprons consisting of chains and slats are well known in the prior art as substitutes for side-by-side belt aprons. Also in this alternative embodiment the guide rolls would be replaced with guide sprockets for engaging the apron chains, and the drive roll 38 would be replaced by a pair of drive sprockets.

Figure 7:
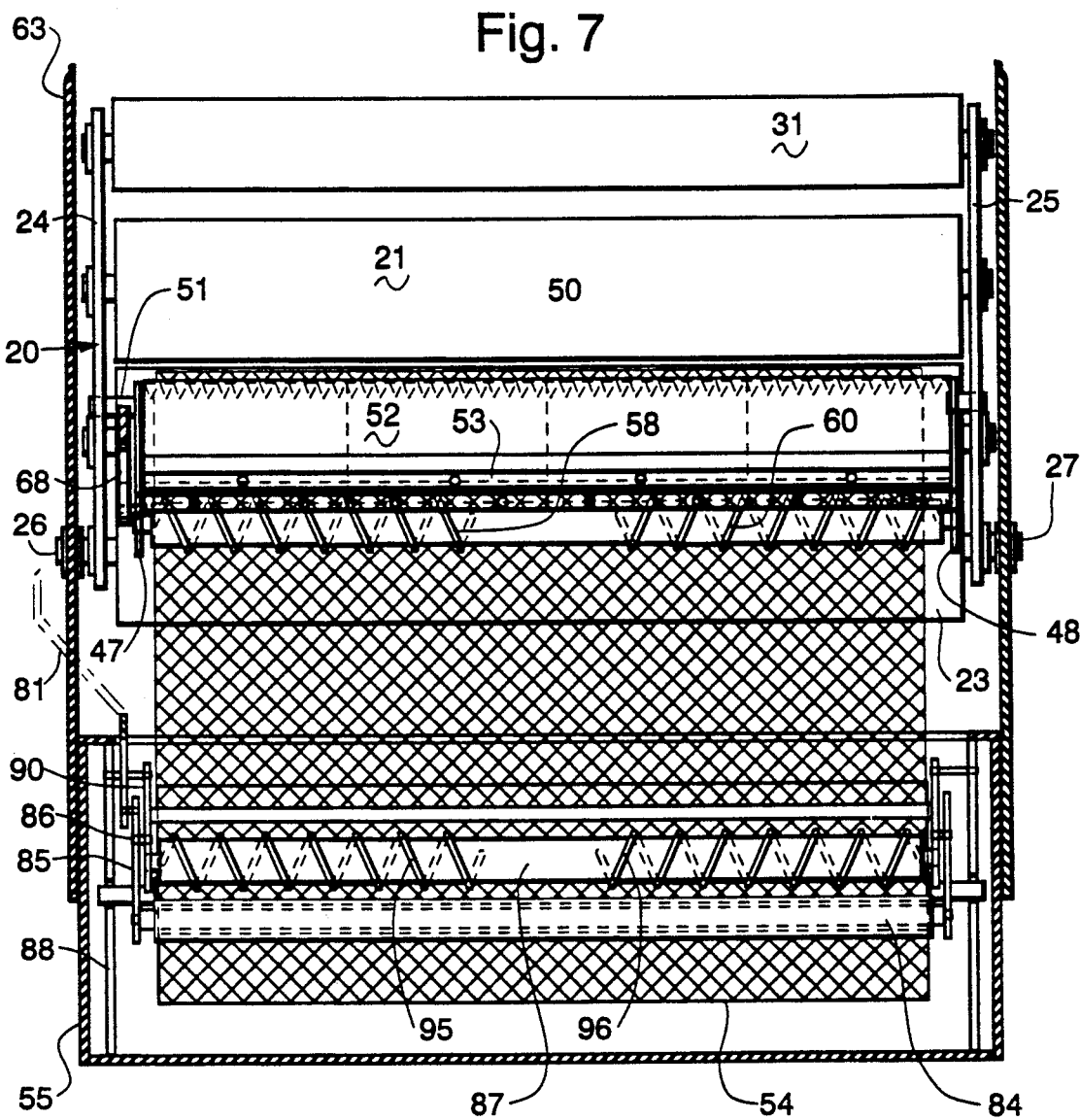
FIG. 7 is a view taken in the direction of arrows 7—7 in FIG. 1 and shows the improved structure of the present invention.

Now turning to the bale wrapping system in which the present invention is embodied, FIG. 1 shows a net dispensing mechanism 45 pivotally mounted on sledge assembly 20 and an interrelated cutting assembly 46 (phantom outline) pivotally mounted between the side walls on main frame 11. As best seen in FIG. 7 dispensing mechanism 46 comprises a pair of levers 47, 48 spaced apart, inter alia, by a transverse idler roll 50, discussed in further detail below. Levers 47, 48 are rotatably supported on a cross tube 51 that extends between arm 24, 25 of sledge assembly 20. The dispensing mechanism 45 further comprises transverse clamping members 52, 53 (see FIG. 2) also extending between levers 47, 48 and arranged to dispense into the forming chamber sheet material s such as net or the like from a supply roll 54 disposed in a container 55 carried on the baler main frame 11. Container 55 has an access lid for placement or removal of supply roll 54. Clamping members 52, 53 are mounted via any conventional means which extend between levers 47, 48. For example, bars may be utilized as shown in U.S. Pat. No. 4,956,968, referred to above. Appropriate means are used to urge clamping member 22 against clamping member 53. Again, for exemplary purposes, the spring and link arrangement of U.S. Pat. No. 4,956,968 is referred to as a known means to effect such clamping action. Thus, as the sheet material s,s' is pulled from supply roll 54 via a slot 57 and guided to clamp members 52, 53 of dispensing mechanism 45, it passes under idler roller 50 which is mounted between and extends transversely of levers 47, 48. This idler roller 50 is provided with net spreading elements 58, 60 affixed to the outer end portions thereof, and spiraled outwardly in a fashion whereby the net passing over idler roll 50 is urged outwardly at the ends. This is accomplished due to the idlers notation direction determined by the travel of the net, causing augering of the net engaged by spiral elements 58, 60.

Referring now to FIGS. 2 and 3, the bale wrapping system in which the present invention is embodied also includes an electromechanical control system for sequentially actuating a net brake in conjunction with the net dispensing mechanism as it is moved between a net feeding operative position, as shown in FIG. 3, and a nonoperative retracted position, as shown in FIGS. 1 and 2. This system also provides for proper actuation of the net cutting assembly to avoid a premature release, the interrelated operation of which elements will be discussed in detail below. In FIGS. 1 and 2 an electric actuator 61 is shown in its retracted position whereas in FIG. 3 it is shown in its extended position and while the retracted position is shown in phantom outline.

Actuator 61 is pivotally mounted to plate 62, which is affixed to the outer surface of sidewall 63 of mainframe 11. A link member, 64, pivotally attached to actuator element 65, is pivoted about fixed pivot pin 66 between the retracted position shown in FIGS. 1 and 2 and the extended position shown in FIG. 3. Affixed to and adapted for rotation with pin 66 and inwardly of side wall 63 is lever 67 shown downwardly inclined in FIGS. 1 and 2 in the non-actuated position of actuated element 65. A net dispensing actuator arm 68 is pivotally connected to lever 67 via pin 70 inwardly of wall, whereby actuator arm 68 moves to the upward position shown in FIG. 3 under conditions where actuator element 65 is extended. When actuator element 65 is retracted, arm 68 is moved downwardly and net dispensing mechanism 45 is moved to the retracted non-operative position (FIG. 2).

Figure 5:
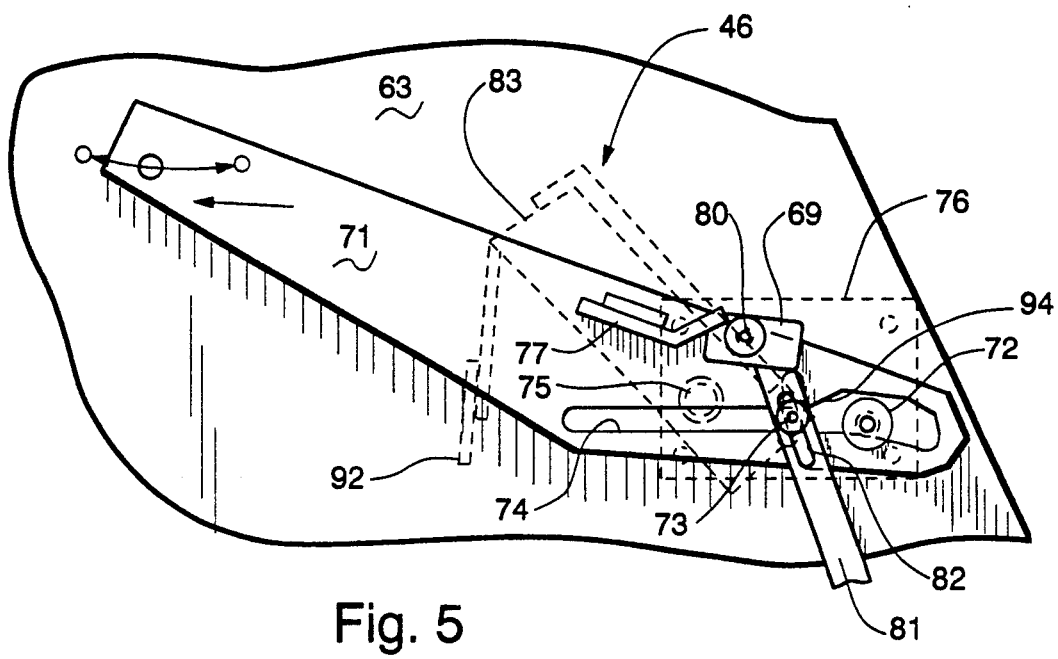
FIG. 5 is a detailed side elevational view of the control mechanism for the net wrapping apparatus of the present invention.
Figure 6:
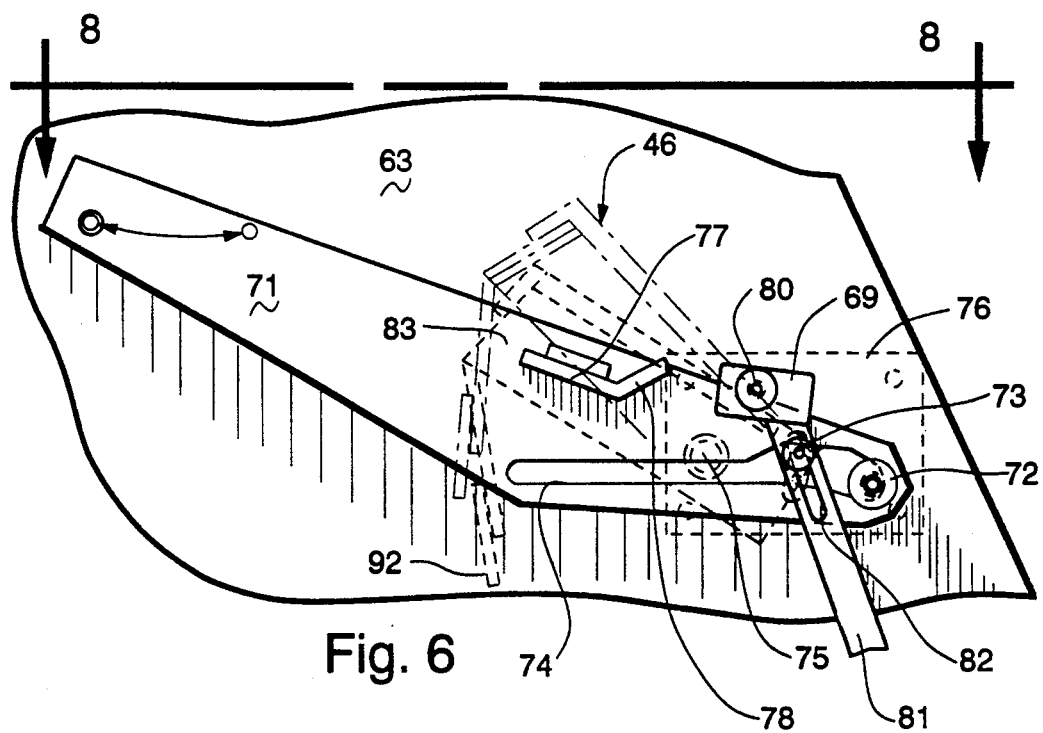
FIG. 6 is also a detailed side elevational view of the control mechanism for the net wrapping apparatus of the present invention and show the elements in an operational position different than shown in FIG. 5
Figure 8:
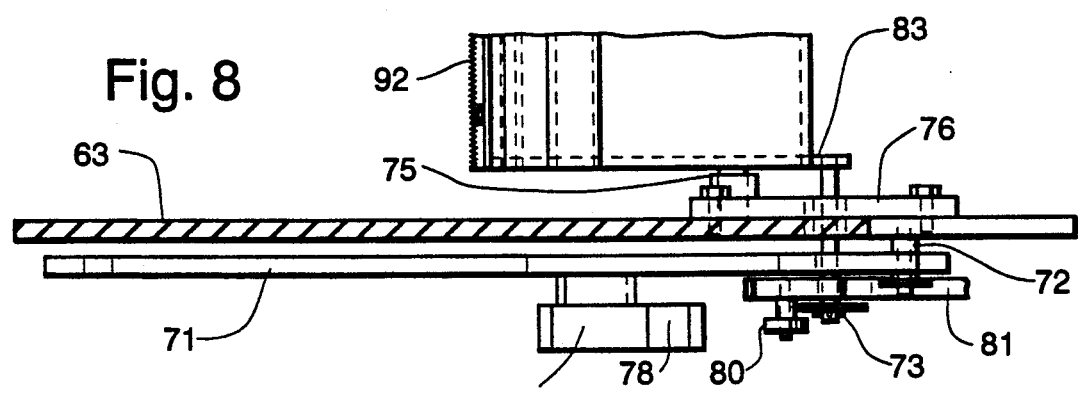
FIG. 8 is a view taken in the direction of arrows 8—8 in FIG. 6.

Pivotally attached to the lower end of link member 64 is a transverse control arm 71 which reciprocates in a generally for and aft direction in response to the position of actuator element 65. The right end of control arm 71 is primarily supported by fixed flanged roller 72 and secondarily supported by knife control roller 73, both of which extend through control arm slot 74. FIGS. 5,6 and 8 show control arm 71 in detail with FIG. 6 depicting conditions when actuator element 65 (not shown in FIGS. 5 & 6) is fully retracted, and FIG. 5 showing control arm and related elements in an intermediate condition. Net cutting assembly 46 pivots around a fixed pivot via a stub shaft 75 affixed to plate 76 secured to the inside surface of side wall 63.

Secured in the intermediate area of control arm 71 is a ramp element 77 having a ramp section 78 positioned to engage a roller 80 secured to a leg member 69 which is integral with net brake control arm 81. A slot 82 in back control arm 81 cooperates with knife roller 73 which is secured to knife side plate 83, which roller guides brake arm 81 along a reciprocal path via slot 82. As shown in FIG. 3 brake arm 81 is in its lowermost position when actuator element 65 is in its extended position, and thereby lifts net brake element 84 from the surface of the net supply roll by pivoting brake mounting arm 85 counterclockwise around pin 86. A counter roll 87 is pivotally mounted on a fixed bracket 88 via a counter roll mounting arm 90 and continually held in contact with the surface of net supply roll 54 by means of spring 91 which urges brake mounting arm downwardly and in turn urges counter roll mounting arm 90 downwardly. FIG. 4 illustrates the position of the brake and counter roll assembly when the net from supply roll has been partially depleted. This unique arrangement provides for continuous contact between the net roll and counter roll 87 while not changing the relationship of brake element and the surface of the net roll, thereby providing for a substantially constant brake force regardless of roll size.

Net cutting assembly 46 includes a pair of knife side plates 83 (only one shown) rotatably supported on stub shaft 75. A knife 92 (only partially shown in FIG. 8) is carried by and extends transversely between knife side plates 83 for engagement with the net material dispensed by dispensing mechanism 45. A net cutting assembly of this general type is fully shown in U.S. Pat. No. 4,956,968. For the purposes of this invention it is believed that the diagrammatic outline showing a similar cutting assembly in non-released and released positions will suffice.

Now turning to the general operation of baler 10, when a bale B has been formed and it is desired to wrap it with net material, electric actuator 61 is activated while apron 32 continues to rotate bale B in a clockwise direction as viewed in FIG. 2. The outer surface of bale B is generally illustrated by heavy broken lines 93 in FIGS. 2 and 3. Actuator element 65 of electric actuator 61 drives control arm 71 from left to right and net dispensing actuator arm 81 from the solid line position of FIG. 2 to the solid line position of FIG. 3. This rotates the dispensing mechanism 45 from a retracted position shown in FIG. 2 to a dispensing position shown in FIG. 3. In the retracted position of the dispensing mechanism 45, a tail s of the net material (see FIG. 1) loosely extends from the portion of the net that is gripped by the clamping members 52, 53. In this retracted position the tail of the net material is not of sufficient length to be fed into the bale forming chamber.

As the dispensing mechanism 45 moves toward its dispensing position (FIG. 3), the cutting assembly 46 is rotated clockwise to the non operative position shown in FIG. 3 and clamping members 52, 53 move into a gap between roller 21 and apron 32. Meanwhile, net brake element 84 has been removed from the surface of supply roll 54 and counter roll 87 has been maintained in operative contact therewith permitting the tail s of the net material gripped between clamping members 52, 53 to be inserted through the gap into the bale forming chamber whereupon it is dragged downwardly and caught in the nip between roller 21 and bale B which are rotating in opposite directions. The net material is then freely dispensed from the supply roll 21 via slot 57, transverse idler roller 50, between clamping members 52, 53, and then through the gap into the bale forming chamber where it is wrapped circumferentially around bale B while the bale continues to be rotated by apron 32. Counter roll 87 is in light continuous contact with the surface of supply roll 54, permitting a minimum drag during dispensing.

After bale B has been wrapped with one or more layers of the net material, electric actuator 61 is reversed thereby moving dispensing mechanism 45 from the dispensing position shown in FIG. 2 to the retracted position shown in FIG. 3. When dispensing mechanism 45 has returned to such retracted position, net cutting assembly 46 is rotated counterclockwise as viewed in FIG. 6 so that knife 92 is brought downwardly into contact with the expanse of net material extending from clamping members 52, 53 of dispensing mechanism 45 to the above describe gap. This rotation is permitted when knife side plates 83 rotate about stub shaft 75 under conditions where knife control roller 73 extends upwardly in brake arm slot 82 upon reaching the ramp 94 in slot 74 in transverse control arm 71. The knife 92 cuts the net material in a known manner and leaves a succeeding tail which is gripped by clamping members 52, 53 for future insertion into the bale forming chamber when the next bale is ready to be wrapped with net material. Prior to cutting, the net brake has been actuated by control arm 81 which travels upwardly via slot 82 when ramp 78 is clear of roller 80, which actuation permits braking force to be applied on the net resulting in necessary tension during cutting. Meanwhile, the spreading elements on idler roll 50 maintain the net at its nominal width to provide conditions desirable for clean, effective cutting of the woven net or the like.

In operation, the width of the net is desirably maintained, during wrapping and cutting, at the same width as the bale being wrapped; however, due to the nature of the flexible woven net used it tends to pull together and present less than its nominal width under tension. This reduction in width becomes more significant the longer the stretch of guided net and the greater the tension. On the other hand as mentioned above it is important that the net be held under sufficient tension to permit proper operation of the cutting assembly which shears the net as it is pulled against the cutting edge of the knife 92. To overcome the problem of net shrinkage while maintaining proper tension the present invention provides the above describe net spreading apparatus comprising spiral elements 58, 60 on transverse idler roll 50 in close proximity to the net clamp which dispenses net to the bale chamber. The net is spread just prior to being fed into the inlet of the clamping mechanism that dispenses it into the bale chamber and thereby maintains it as close as possible at the nominal width of the net (shown in FIG. 7) which corresponds to the approximate width of the bale that has been formed in the bale chamber. Additionally, the invention contemplates spiral spreader elements 95, 96 on counter roller 87 which is continually in contact with supply roll 54 for those conditions where prespreading of the net is required or desirable prior to traversal around idler roller 50. It has been determined that these supplemental spreader elements are even more desirable when the net is alternatively fed from the supply roll in a direction opposite to that shown in the drawings and then around the counter roll in an "S" shaped path which in turn rotates counter roll 87 in the opposite direction.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for forming crop material into cylindrical bales, said baler having
  a main frame,
  a tailgate pivotally connected to said main frame,
  a sledge assembly mounted on said main frame for movement between a bale starting position and a full bale position, said sledge assembly including a plurality of rollers extending transversely of said main frame,
  an apron movably supported along a continuous path on said main frame and on said tailgate, said apron path having an inner course that cooperates with the rollers of said sledge assembly to define a bale forming chamber, and
  dispensing means comprising a pair of arms pivotally mounted on said sledge assembly, and sheet clamping means mounted and moveable with said arms and extending toward said bale forming chamber for dispensing sheet material into said bale forming chamber so that the sheet material is wrapped circumferentially around a cylindrical bale of crop material in said bale forming chamber under conditions wherein said arms pivot said clamping means to a position adjacent said chamber, the improvement comprising
  spreader means mounted on said dispensing means, said spreader means comprising a transverse roll rotatably mounted between and moveable with said arms and means in the vicinity of the ends of said transverse roll for operatively engaging said sheet material prior to being dispensed into said bale forming chamber via said sheet clamping means to maintain said sheet material at a width substantially corresponding to the width of the cylindrical bale around which it is being wrapped.

2. A round baler as set forth in claim 1 wherein said sheet material dispensed from said dispensing means is a continuous web of net, and said means in the vicinity of the ends of said transverse roll comprising means for urging said net outwardly.

3. A round baler as set forth in claim 2 wherein said means for urging comprises spirally disposed means affixed to said roll for augering the edges of said net outwardly to enable the net to maintain its nominal width.

4. A round baler as set forth in claim 3 wherein said spirally disposed means comprises oppositely directed flighting extending from the ends of said roll for engaging said edges of said net.

5. A round baler as set forth in claim 1 wherein said round baler further includes a supply assembly for storing said sheet material, said supply assembly mounted on said main frame and comprising a rotatably mounted supply roll having a width substantially the same as the width of said bale forming chamber, and means for feeding said sheet material from said supply roll to said dispensing means, the improvement further comprising
    second spreader means including second means for operatively engaging said sheet material as it is being fed from said supply roll to maintain said sheet material at a width corresponding substantially to the width of said supply roll.

6. A round baler as set forth in claim 5 wherein
    said sheet material is a continuous web of net, and
    said second means for engaging comprises a second transverse roll substantially the same width as the chamber and means in the vicinity of the ends of said second transverse roll for urging said net outwardly.

7. A round baler as set forth in claim 6 wherein said means for urging comprises spirally disposed means affixed to said roll for augering the edges of said net outwardly to enable the net to maintain its nominal width.

8. A round baler as set forth in claim 7 wherein said spirally disposed means comprise oppositely directed flighting extending from the ends of said roll for engaging said edges of said net.

* * * * *